Nov. 22, 1960    J. E. SHERRINGTON    2,961,125
CONVEYOR MECHANISMS
Filed March 1, 1957    4 Sheets-Sheet 1
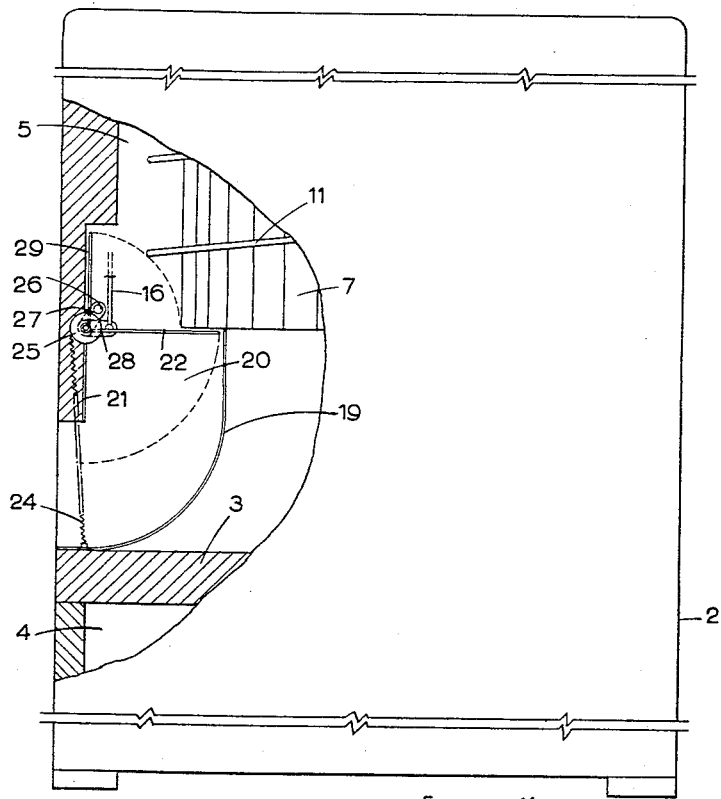
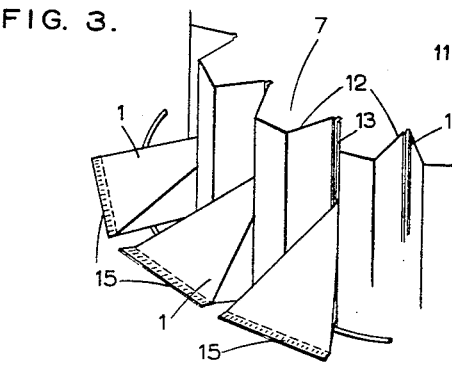
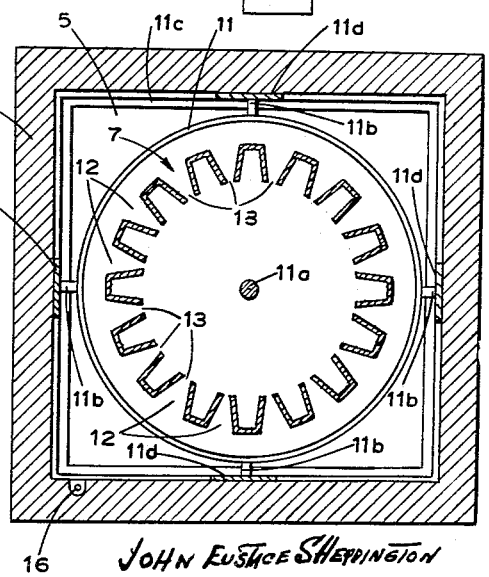
JOHN EUSTACE SHERRINGTON
INVENTOR
by
ATTORNEY Nov. 22, 1960  J. E. SHERRINGTON  2,961,125
CONVEYOR MECHANISMS Filed March 1, 1957

John Eustace Sherrington
INVENTOR

United States Patent Office 2,961,125
Patented Nov. 22, 1960

2,961,125

CONVEYOR MECHANISMS

John Eustace Sherrington, Southgate, London, England, assignor to Farrow and Jackson Limited, London, England Filed Mar. 1, 1957, Ser. No. 643,467

Claims priority, application Great Britain Mar. 1, 1956

4 Claims. (Cl. 221—75)

This invention relates to conveyor mechanisms in which a series of similar objects are caused to descend or rise on a helical guide.

The invention is particularly applicable to the delivery of purchased articles in succession to the point at which they are delivered to the customer in a coin-freed vending machine, although it will be clear that the invention is applicable to most cases in which articles are to be raised or lowered from one level to another.

Moreover the invention may very conveniently be employed for feeding in series cartons, containing, for example, a beverage such as milk, in the shape of a tetrahedron. Such cartons are made by closing a waxed cardboard tube at its opposite ends along two lines at right angles, the closures consisting of two flanges lying in two planes at right angles to one another. It will, however, be apparent that the invention can be adapted to objects having other shapes.

According to the invention, a conveyor mechanism for lowering or raising a series of similar objects includes a helical track mounted with its axis substantially vertical, a concentric support shaped to engage the objects so as to prevent them from toppling off the track when they rest thereon at points remote from the support but to permit the objects to fall or rise relatively to the support when sliding along the helical track, and means for effecting relative rotation between the support and helical track, the support being arranged to cause the objects to slide along the track during such relative rotation. Preferably the support is located inside the helical track, (which preferably presents a continuous surface, and may be a simple rail) and the relative rotation is effected by rotating the support while maintaining the helical rail stationary.

The support may consist of a drum formed with a series of substantially vertical grooves shaped to engage the ends of the objects so as to prevent them from toppling off the rail and at the same time cause them to travel along the rail during the relative rotation of the support and rail. Where the mechanism is designed to to feed forward cartons having V shaped ends sealed along flanges, as in the aforementioned tetrahedron shaped cartons, the grooves may have a V-shaped cross-section and be formed with slots at their apices to receive the flanges.

The support may be rotated by a motor acting through an irreversible gear and a unidirectional clutch permitting the support to be turned backwards to facilitate loading.

In order that the invention may be clearly understood and readily carried into effect, apparatus in accordance therewith will now be described, by way of example, with reference to the accompanying drawings, in which:

Figure 1 is a diagrammatic side elevation of a coin-freed, refrigerated vending machine with a portion of a side wall shown broken away to disclose the interior thereof;

Figure 3 is a diagrammatic perspective view of a fragment of the machine of Figures 1 and 2, shown with cartons positioned therein;

Figure 8 is a cross-section on the line VIII—VIII in Fig. 2.

Figure 4:
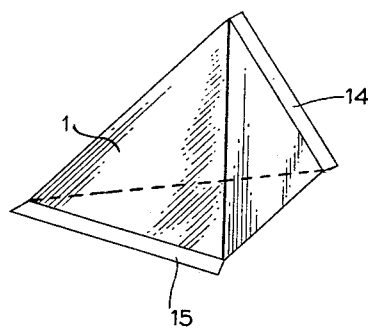
Figure 4 is a perspective view of a complete carton as shown in Figure 3.

The example of Figures 1 to 4 consists of a coin-freed vending machine for half-pint milk cartons 1 of tetrahedral shape (see Figure 4). It comprises a tall container or cabinet 2 divided by a horizontal partition 3 into a lower compartment 4 and a much taller upper compartment 5 containing the conveyor mechanism together with the evaporator (not shown) of a refrigerator system and a motor driven fan (not shown) for drawing cold air through the evaporator and causing it to circulate over the cartons mounted in the conveyor mechanism. The lower compartment contains the motor and compressor of the refrigerator system as well as a second and smaller motor 6 for driving the conveyor mechanism. The second motor 6 drives a drum 7 in the conveyor mechanism by means of a worm reduction gear, a ratchet and pawl unidirectional clutch, pulleys 8, 9 and belt 10 and a vertical shaft 11a extending upwards through a bush in the partition 3 and carrying the drum 7 co-axially. Surrounding the drum 7 co-axially, and spaced therefrom, is a stationary helical rail 11 carried by members 11b (Fig. 2) projecting radially inwards as far as the rail from vertical members 11d in a welded steel rectangular frame 11c fitted inside the compartment 5. The helical rail 11 is formed from round section brass rod and it has nine convolutions. The drum has equidistantly spaced about its outer periphery sixteen vertical grooves 12, so that, when fully loaded, the conveyor holds one gross of cartons. Each groove 12 has a V-shaped cross-section and is formed at its apex with a vertical slot 13. The groove 12 substantially fits the V-shaped inner end of a carton (as shown in Figures 3 and 4) when the flange 14 at that end projects into the slot 13. The flange 14, however, does not lie exactly vertically owing to the inclination of the helical rail 11 and the slot 13 is made wide enough to allow for this. The flange 15 at the opposite end of the carton lies just beyond the rail 11 which engages each carton 1 about an inch radially inwards from its outer extremity.

Figure 2:
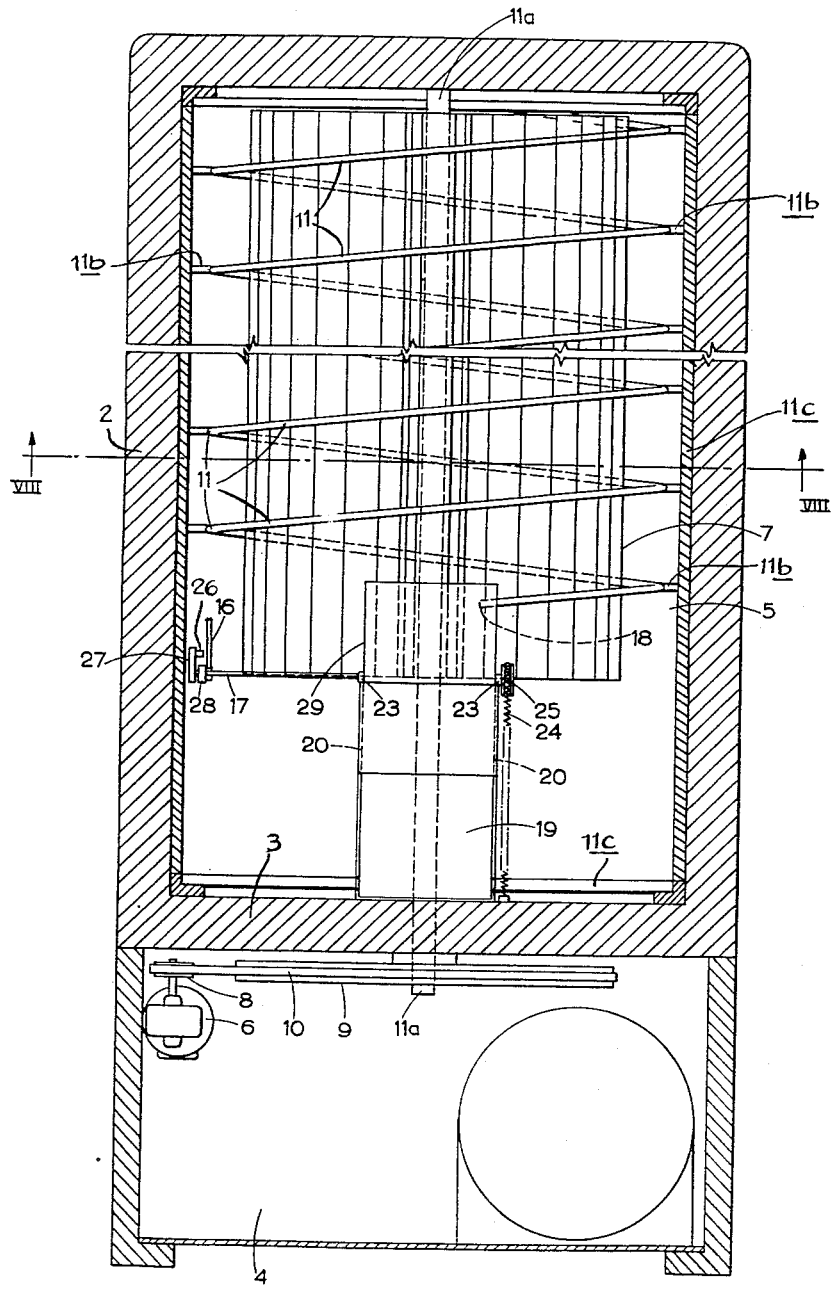
Figure 2 is a diagrammatic front elevation of the machine of Figure 1 shown with the front wall removed.

When a purchaser desires to obtain a carton of milk, he inserts a token such as a coin through a slot (not shown) at the front of the cabinet which actuates coin-freed mechanism that causes a spring-loaded lever 16a to trip over a dead-centre position to close a switch 16b and simultaneously raise a link 16 (Fig. 1), the lower end only of which appears in Fig. 2. The link 16 extends through a slot in the wall of a cabinet to a space therein in which the lever 16a is mounted. The raising of the lever 16 starts the conveyor motor 6, so causing the drum 7 to rotate and slide the cartons downwards along the helical rail 11 until the lowermost carton drops off the end 18 of the rail through a horizontal opening at the top of a chute or recess in the front wall of the cabinet 2, bounded at the rear by a curved plate 19, at the sides by plates 20 and at the front by a plate 21. The coin freed mechanism is not shown, as it forms no part of the present invention. The nearer side plate 20 is shown removed in Figure 1.

As the carton topples off the end 18 of the rail 11, it falls past a trap door 22 fixed to the spindle 17 which is journalled in fixed bearings 23, the trap door being arranged to close the top of the chute and to be opened against the action of a tension spring 24 anchored at its lower end to a fixed point and at its upper end to a pulley 25 fixed to the spindle 17 (Fig. 2). The trap door spindle 17 is therefore turned about its axis with the result that a finger 26 on a small lever 27 fixed thereto beneath the main portion of the coin mechanism bears on and swings downwards a second lever 28 pivotally mounted on the spindle 17. This second lever 28 is pivoted to the link 16 so that the movement of the trap door 22 resets the spring-loaded trip lever 16a to its original position (Fig. 1) enabling the switch 16b to open and stop the motor 6. As soon as the carton has passed the trap door 22, the spring 24 returns it to its closed position. The said second lever 28 remains in its lowermost position until another coin is inserted so that the trap door and its spindle can be swung to-and-fro about their axis without affecting the trip lever.

This means that it is possible to swing the trap door to-and-fro by hand and, to prevent any carton being manually removed from the conveyor mechanism, a rigid second door or flap 29 is fixed to the trap door 22 at right angles thereto at the pivoted edge thereof. When the trap door is closed this second door projects vertically upwards, but when the trap door is opened it swings downwards to prevent an arm from being thrust through the recess to the conveyor mechanism. The second door 29, however, is not such as to prevent a carton 1 from falling through the trap door because, when the latter is opened by the weight of a carton, the second door simply swings round over the top of the carton.

To recharge the machine with cartons, the front of the cabinet is opened and the cartons placed one by one on the front of the rail 11, the cartons being fed round and up the rail by turning the drum in the direction permitted by the aforesaid unidirectional clutch.

Figure 6:
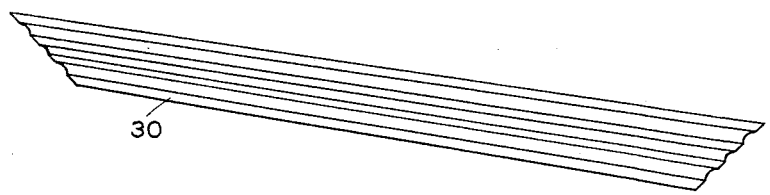
Figures 6 and 7 are respectively a front elevation and plan of a detail of the machine of Figure 5.
Figure 7:
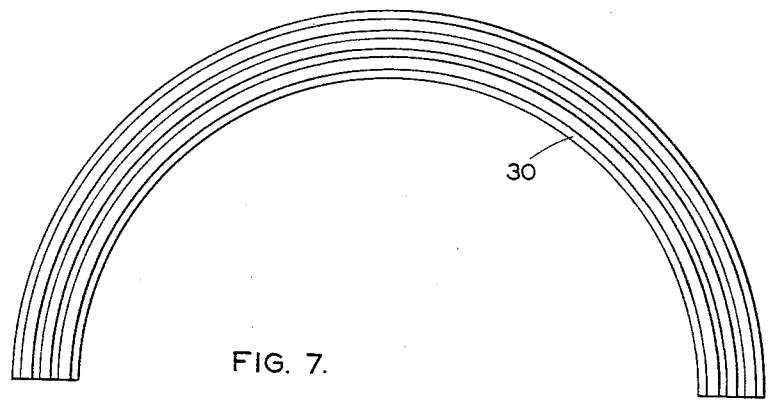
Figure 5:
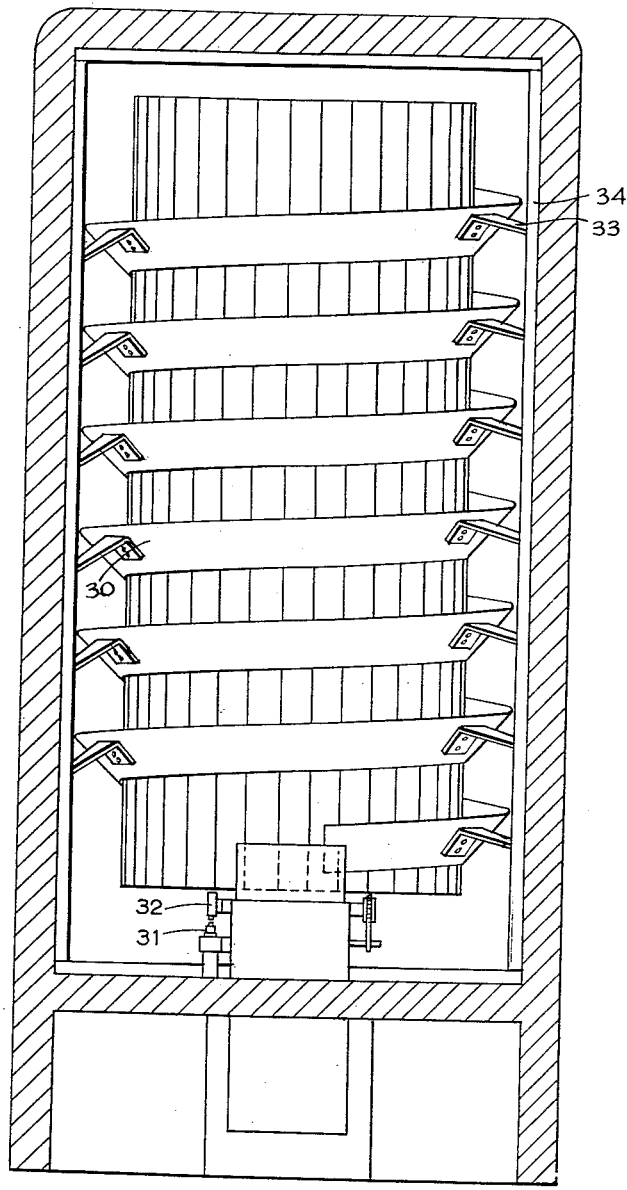
Figure 5 is a diagrammatic sectional front elevation of a modification of the machine of Figures 1 to 3.

The main difference between the construction of Figures 5 to 7 and that of Figures 1 to 3 is that the rail 11 of Figures 1 to 3 is replaced by a much wider rail constituted by a helical strip 30 supported by members 33 extending inwards from a frame 34 as in the case of the rail 11. To give an idea of the size of the apparatus, it may be stated that the outer diameter of the helix is roughly two feet and the width of the strip, in its own plane, is two and three quarters inches, this plane being inclined at forty-five degrees. The pitch of the helix is five and a half inches. As shown in Figures 6 and 7 but not in Figure 5, the strip is corrugated for strength.

The motor for the conveyor mechanism is controlled by a spring-loaded trip lever moved in one direction by coin-freed mechanism to start the motor and in the opposite direction to stop the motor by a solenoid energized under the control of a switch 31 that is closed against spring action by a cam 32 on the spindle of the trap door, as the latter is opened, the switch 31 automatically opening when the trap door returns to its closed position.

I claim:

1. A conveyor mechanism for feeding a series of tetrahedral cartons substantially vertically, and comprising in combination, a vertical rotor formed with vertical guides for inner edges of said cartons while said edges are in a nearly vertical position, a stationary peripheral helix arranged for the outer edges of the cartons to lie upon while said outer edges are nearly horizontal, the mechanism including a cabinet containing said rotor and helix and formed in one wall with a recess at the bottom of the helix and with an opening at the top of the recess, a trap door pivoted to swing in a direction normal to its plane and operative to close said opening, means for rotating the rotor and arranged to feed the cartons in the downward direction on said helix in a manner to cause the cartons to fall in succession through the trap door, biasing means adapted to return the trap door to its closed position immediately after the passage of a carton through said opening and past said door, and a rigid flap fixed to said door on the side thereof remote from said recess and in such a position as to prevent access from being obtained to the cartons on said helix in the event of said trap door being opened by hand, but to permit each carton to pass through the door ahead of said flap.

2. Means for dispensing similar objects in succession from a cabinet formed with an opening through which the objects are delivered, said means comprising in combination wall means including a hinged door covering an area within the cabinet at the opening, conveyor means within the cabinet adapted to convey each object to a point close to the opening but above the area and subsequently to cause the object to be deposited on said hinged door and move through said opening, biasing means operative to return said door to position above said opening after the passage of an object, and a flap rigidly fixed to the door above said opening and adapted to move with said door to block communication between the opening and the point close to the opening in the event of said door being opened by hand, the angular relationship between the door and said flap being such, in relation to the size of the object, as to permit each object after being conveyed to said point by said conveyor means to pass through said opening ahead of the flap when said object is located between the door and the flap, and then to pass beyond said door whereupon said biasing means returns said door to the original position, said flap being fixed in angular relation to said door adjacent the pivot thereof and covering substantially the same area as said door, said door being pivoted at one edge of said opening.

3. The structure of claim 2; and a chute depending beneath said opening, said opening being formed at one side of said conveyor means, and said door being arranged as a trap door extending toward said conveyor means and pivoted into said chute.

4. The conveyor mechanism according to claim 4, in which said flap is fixed substantially at right angles to said door at the pivot thereof and has nearly the same areas as said door, said door being pivoted at one edge of said opening.

References Cited in the file of this patent

UNITED STATES PATENTS

| | | |
|---|---|---|
| 1,616,824 | Redlinger | Feb. 8, 1927 |
| 2,178,000 | Siehrs | Oct. 31, 1939 |
| 2,441,519 | Terhune | May 11, 1948 |
| 2,464,737 | Wellekens | Mar. 15, 1949 |
| 2,642,328 | Nystedt | June 16, 1953 |

FOREIGN PATENTS

| | | |
|---|---|---|
| 905,239 | Germany | Mar. 1, 1954 |